United States Patent
Handa et al.

(10) Patent No.: US 12,240,448 B2
(45) Date of Patent: Mar. 4, 2025

(54) VEHICLE STEERING ASSIST DEVICE

(71) Applicant: TOYOTA JIDOSHA KABUSHIKI KAISHA, Toyota (JP)

(72) Inventors: Satoshi Handa, Kariya (JP); Satoshi Inoue, Anjo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 216 days.

(21) Appl. No.: 17/988,224

(22) Filed: Nov. 16, 2022

(65) Prior Publication Data

US 2023/0202465 A1 Jun. 29, 2023

(30) Foreign Application Priority Data

Dec. 24, 2021 (JP) ................................ 2021-210661

(51) Int. Cl.
*B60W 30/09* (2012.01)
*B60W 10/20* (2006.01)
*B60W 40/02* (2006.01)

(52) U.S. Cl.
CPC ............ *B60W 30/09* (2013.01); *B60W 10/20* (2013.01); *B60W 40/02* (2013.01); *B60W 2540/18* (2013.01); *B60W 2710/202* (2013.01)

(58) Field of Classification Search
CPC .... B60W 30/09; B60W 30/045; B60W 30/12; B60W 10/20; B60W 40/02; B60W 2540/18; B60W 2710/202
USPC ........................................ 701/41, 42, 43, 44
See application file for complete search history.

(56) References Cited

U.S. PATENT DOCUMENTS

| 9,321,484 B2* | 4/2016 | Morotomi | ............. B62D 6/002 |
| 11,572,096 B2* | 2/2023 | Suzuki | ............. B62D 15/0265 |
| 2017/0066476 A1 | 3/2017 | Kudo | |
| 2022/0227417 A1 | 7/2022 | Suzuki | |

FOREIGN PATENT DOCUMENTS

| JP | 2003-063430 A | 3/2003 |
| JP | 2017-52353 A | 3/2017 |
| JP | 2018-100078 A | 6/2018 |
| WO | 2020/261530 A1 | 12/2020 |

OTHER PUBLICATIONS

Unpublished U.S. Appl. No. 17/840,793, filed Jun. 15, 2022, Inventors: Shusaku Sugamoto et al.

* cited by examiner

*Primary Examiner* — Hai H Huynh
(74) *Attorney, Agent, or Firm* — Sughrue Mion, PLLC

(57) ABSTRACT

In a vehicle steering assist device that includes an electric power steering device that generates a control torque that modifies a return torque for urging a steering wheel to a neutral position, a steering assist ECU that controls the control torque, and a surrounding information detecting device (camera sensor, radar sensor) that detects at least information in front of a vehicle, the control torque is controlled such that a ratio of a change amount of the modified return torque to a change amount of a steering operation amount at the start of avoidance steering decreases when an obstacle is detected in front of the vehicle by the surrounding information detecting device and the avoidance steering for the vehicle to avoid collision with the obstacle is determined to be required.

3 Claims, 9 Drawing Sheets

VEHICLE STEERING ASSIST DEVICE

CROSS-REFERENCE TO RELATED APPLICATION

This application claims priority to Japanese Patent Application No. 2021-210661 filed on Dec. 24, 2021, incorporated herein by reference in its entirety.

BACKGROUND

1. Technical Field

The present disclosure relates to a steering assist device for a vehicle such as an automobile.

2. Description of Related Art

As a steering assist device for a vehicle such as an automobile, a steering assist device that promotes that the steering angle becomes an optimum steering angle by obtaining the optimum steering angle for the vehicle to travel and controlling a steering reaction force such that the steering angle becomes the optimum steering angle is known.

For example, the Japanese Unexamined Patent Application Publication No. 2003-063430 (JP 2003-063430 A) below describes a steering assist device that is configured to obtain a traveling status such as a vehicle speed of a host vehicle and a positional relationship of the host vehicle with respect to a traveling lane while obtaining a relative position of another vehicle present around the host vehicle and its changing direction, estimate such changes and obtain the optimum locus of the host vehicle, and obtain the optimum steering angle to make the locus of the host vehicle to be the optimum locus.

According to the steering assist device as described above, the optimum locus and the optimum steering angle for the host vehicle to travel appropriately in relation to other vehicles are obtained, and the driver is encouraged to perform a steering operation such that the steering angle becomes the optimum steering angle and the locus of the host vehicle becomes the optimum locus.

SUMMARY

When the vehicle travels, an obstacle such as a stopped vehicle may be present in front of the vehicle, or an obstacle may appear in front of the vehicle. In such a situation, avoidance steering needs to be performed such that the vehicle does not collide with the obstacle. Therefore, when steering assist is performed by the steering assist device of the related art as described above, the driver needs to perform a steering operation such that the steering angle becomes a steering angle different from the optimum steering angle against a steering reaction force that encourages the driver to steer. Therefore, the steering force required for the avoidance steering becomes higher than that in the case where the driving assist that encourages the driver to perform the steering operation is not performed by controlling the steering reaction force.

The main subject of the present disclosure is to provide a steering assist device that is improved so as to assist the steering operation of the driver and to reduce the steering force required for the driver to perform avoidance steering such that the vehicle does not collide with an obstacle, compared with the related art.

The present disclosure provides a vehicle steering assist device (100) including a steering input member (steering wheel 14) that a driver operates to steer, a steering device (10) that is configured to turn a turning wheel (16FR, 16FL) in accordance with a steering operation amount ($\theta$) applied to the steering input member and apply a return torque (Trea) for urging the steering input member to a neutral position such that the return torque becomes larger as the steering operation amount becomes larger, a control torque generating device (electric power steering device 12) that modifies the return torque and generates a control torque (Tc) for assisting a steering operation of the driver, a control unit (steering assist ECU 50) that controls the control torque by controlling the control torque generating device, and a surrounding information detecting device (camera sensor 51, radar sensor 52) that detects at least information in front of a vehicle.

The control unit (steering assist ECU 50) is configured to determine whether avoidance steering for the vehicle to avoid collision with an obstacle is required (S50) when the obstacle is detected in front of the vehicle by the surrounding information detecting device (S40), and is configured to change the control torque such that a ratio of a change amount of the modified return torque to a change amount of the steering operation amount at a start of the avoidance steering decreases when the control unit determines that the avoidance steering is required (S80 to S100).

According to the above configuration, the control torque for modifying the return torque for urging the steering input member to the neutral position is controlled by controlling the control torque generating device by the control unit. Further, when the avoidance steering for the vehicle to avoid collision with the obstacle is determined to be required, the control torque is changed such that the change amount of the modified return torque to the ratio of the change amount of the steering operation amount at the start of the avoidance steering decreases.

Therefore, when the avoidance steering is performed so as to increase the steering operation amount (to make additional turning), the ratio of the increase amount of the modified return torque to the increase amount of the steering operation amount decreases, whereby a reaction force torque against the avoidance steering can be reduced. On the contrary, when the avoidance steering is performed so as to reduce the steering operation amount (to turn back), the ratio of the decrease amount of the modified return torque to the decrease amount of the steering operation amount decreases, whereby a steering promotion torque in the direction of turning back by the modified return torque can be increased. Therefore, it is possible to reduce the steering force required for the avoidance steering in any of the cases where the avoidance steering is the steering by additional turning and where the avoidance steering is the steering by turning back.

Aspects of the Disclosure

According to an aspect, the control unit (ECU 40) is configured to calculate a target steering operation amount for causing the vehicle to travel along a lane based on information of the lane detected by the surrounding information detecting device, and control the control torque such that a ratio of an increase amount of the return torque to an increase amount of the steering operation amount increases in a region where the steering operation amount is larger than the target steering operation amount and control the control torque such that a ratio of a decrease amount of the return torque to a decrease amount of the steering operation amount increases in a region where the steering operation amount is smaller than the target steering operation amount.

The control unit is further configured to, when the control unit determines that the avoidance steering is required, reduce the control torque such that a ratio of a change amount of the modified return torque to a change amount of the steering operation amount from the target steering operation amount becomes smaller compared with when the control unit determines that the avoidance steering is not required.

According to the above aspect, in the region where the steering operation amount is larger than the target steering operation amount, the control torque is controlled such that the ratio of the increase amount of the return torque to the increase amount of the steering operation amount increases. On the contrary, in the region where the steering operation amount is smaller than the target steering operation amount, the control torque is controlled such that the ratio of the decrease amount of the return torque to the decrease amount of the steering operation amount increases.

Therefore, when steering (additional turning) is performed such that the steering operation amount becomes larger than the target steering operation amount, the ratio of the increase amount of the modified return torque to the increase amount of the steering operation amount increases, whereby a reaction force torque against steering can be increased. On the contrary, when steering (turning back) is performed such that the steering operation amount becomes smaller than the target steering operation amount, the ratio of the decrease amount of the modified return torque to the decrease amount of the steering operation amount increases, whereby a steering promotion torque in the direction of turning back by the return torque can be reduced. Therefore, the steering operation amount can easily become the target steering operation amount, and the steering of the driver can be assisted such that the steering operation amount becomes the target steering operation amount.

Further, according to the above aspect, the avoidance steering for the vehicle to avoid collision with the obstacle is determined to be required, the control torque is reduced such that a ratio of a change amount of the modified return torque to a change amount of the steering operation amount from the target steering operation amount becomes smaller compared with when the avoidance steering is determined to be not required.

Therefore, when the avoidance steering is performed so as to increase the steering operation amount from the target steering operation amount (to make additional turning), the ratio of the increase amount of the modified return torque to the increase amount of the steering operation amount decreases, whereby a reaction force torque against the avoidance steering can be reduced. On the contrary, when the avoidance steering is performed so as to reduce the steering operation amount from the target steering operation amount (to turn back), the ratio of the decrease amount of the modified return torque to the decrease amount of the steering operation amount decreases, whereby a steering promotion torque in the direction of turning back by the modified return torque can be increased. Therefore, the steering force required for the avoidance steering can be reduced in any of the cases where the avoidance steering is the steering by additional turning from the target steering operation amount and where the avoidance steering is the steering by turning back from the target steering operation amount.

According to another aspect of the present disclosure, the control unit (ECU 40) is configured to, when the control unit determines that the avoidance steering is required, change the control torque such that a ratio of a change amount of the modified return torque to a change amount of the steering operation amount from a current steering operation amount becomes smaller compared with when the control unit determines that the avoidance steering is not required.

According to the above aspect, the avoidance steering for the vehicle to avoid collision with the obstacle is determined to be required, the control torque is changed such that the ratio of the change amount of the modified return torque to the change amount of the steering operation amount from the current steering operation amount becomes smaller compared with when the avoidance steering is determined to be not required.

Therefore, when the avoidance steering is performed so as to increase the steering operation amount from the current steering operation amount (to make additional turning), the ratio of the increase amount of the modified return torque to the increase amount of the steering operation amount decreases, whereby a reaction force torque against the avoidance steering can be reduced compared with the case where the return torque is not modified. On the contrary, when the avoidance steering is performed so as to reduce the steering operation amount from the current steering operation amount (to turn back), the ratio of the decrease amount of the modified return torque to the decrease amount of the steering operation amount decreases, whereby a steering promotion torque in the direction of turning back by the modified return torque can be increased compared with the case where the return torque is not modified. Therefore, it is possible to reduce the steering force required for the avoidance steering in any of the cases where the avoidance steering is the steering by additional turning from the current steering operation amount and where the avoidance steering is the steering by turning back from the target steering operation amount.

In the above description, in order to help understanding of the present disclosure, the names and/or the reference signs used in the embodiments are added in parentheses to the configurations of the disclosure corresponding to the embodiments to be described later. However, each component of the present disclosure is not limited to the component of the embodiments corresponding to the name and/or the symbol attached in parentheses. Other objects, other features and accompanying advantages of the present disclosure will be readily understood from the description of embodiments of the present disclosure described with reference to the following drawings.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 6 is a diagram for explaining an imaging reference position and the like;

DETAILED DESCRIPTION OF EMBODIMENTS

First Embodiment

Figure 1:
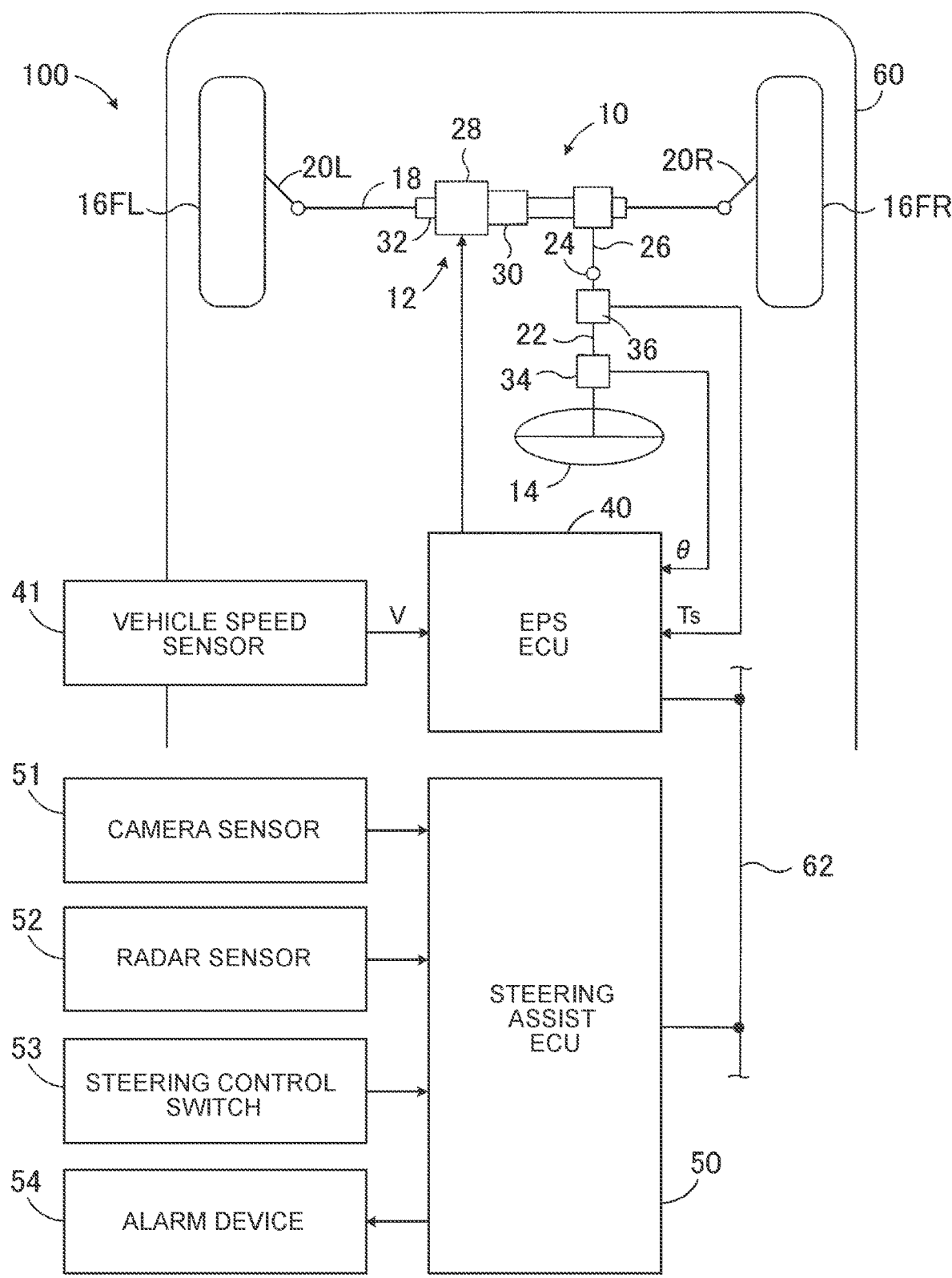
FIG. 1 is a schematic configuration diagram showing embodiments of a steering assist device according to the present disclosure.

As shown in FIG. 1, a steering assist device 100 according to a first embodiment is applied to a vehicle 60 including a steering device 10, an electric power steering ECU 40, and a steering assist ECU 50. In the present specification, electric power steering is referred to as an EPS (that is an abbreviation of Electric Power Steering) as necessary.

The electric power steering ECU 40 and the steering assist ECU 50 are electric control units each including a microcomputer as a main unit, and are connected so as to be able to transmit and receive information to and from each other via a controller area network (CAN) 62. Each of the microcomputers include a central processing unit (CPU), a read-only memory (ROM), a random access memory (RAM), a non-volatile memory, and an interface (I/F), and the like. The CPU realizes various functions by executing instructions (programs, routines) stored in the ROM. Some or all of these ECUs may be integrated into one ECU.

As shown in FIG. 1, the steering device 10 includes an EPS device 12. The EPS device 12 is configured as a rack and pinion type electric power steering device driven in response to an operation of a steering wheel 14 by the driver. The rack bar 18 of the EPS device 12 to connected to knuckle arms (not shown) of front wheels 16FR, 16FL via tie rods 20R, 20L. The steering wheel 14 is connected to a pinion shaft 26 of the EPS device 12 via a steering shaft 22 and a universal joint 24.

When the vehicle 60 turns, the self-aligning torque acts on the front wheels 16FR, 16FL that are the turning wheels, and the self-aligning torque is transmitted to the steering wheel 14 via the steering device 10. Therefore, the steering wheel 14 is subjected to a return torque Tre (return torque when a steering assist torque Tsa (to be described later) is not generated) that urges the steering wheel 14 to a neutral position, that is, a straight-ahead position of the vehicle. The self-aligning torque increases as the turning angle of the front wheels increases and also increases as the vehicle speed increases.

Figure 4:
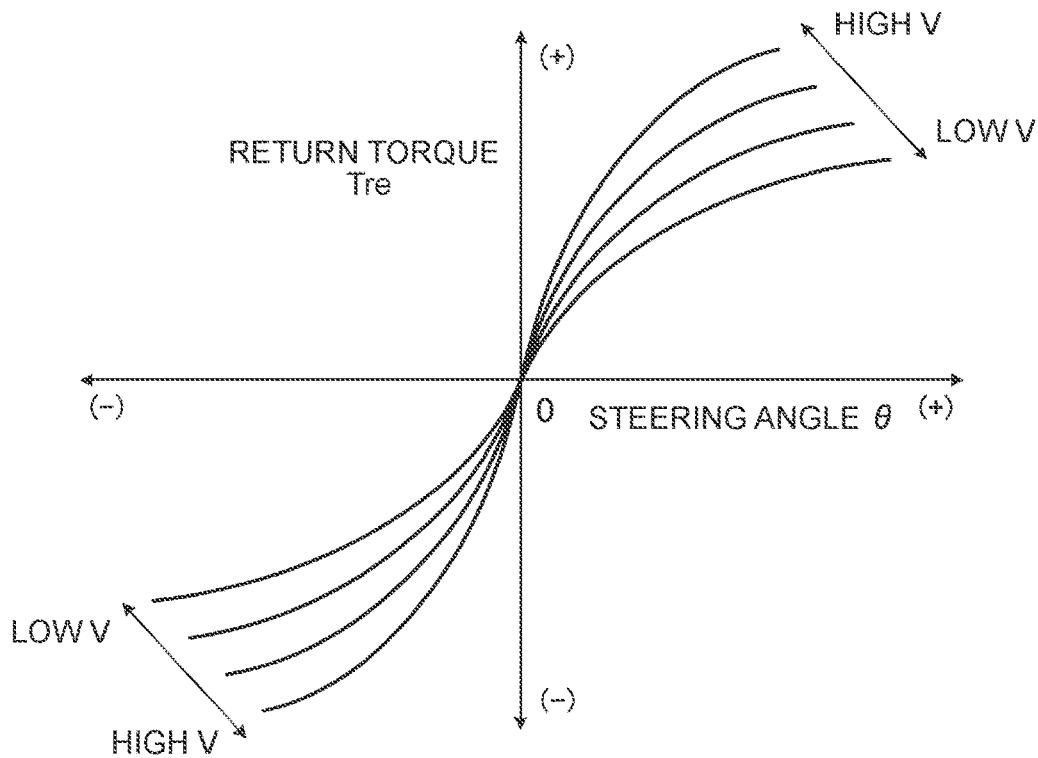
FIG. 4 is a diagram showing a relationship among a steering angle θ, a vehicle speed V, and a return torque Tre.

On assumption that a steering angle θ that is the rotation angle of the steering wheel 14 becomes positive when the vehicle 60 turns to the right, and the return torque Tre becomes positive when the return torque Tre acts in the counterclockwise direction, the magnitude of the return torque Tre becomes larger as an absolute value of the steering angle θ increases, as shown in FIG. 4. The rate of increase of the return torque Tre decreases as the absolute value of the steering angle θ increases. Further, the magnitude of the return torque Tre increases as a vehicle speed V increases.

Figure 5:
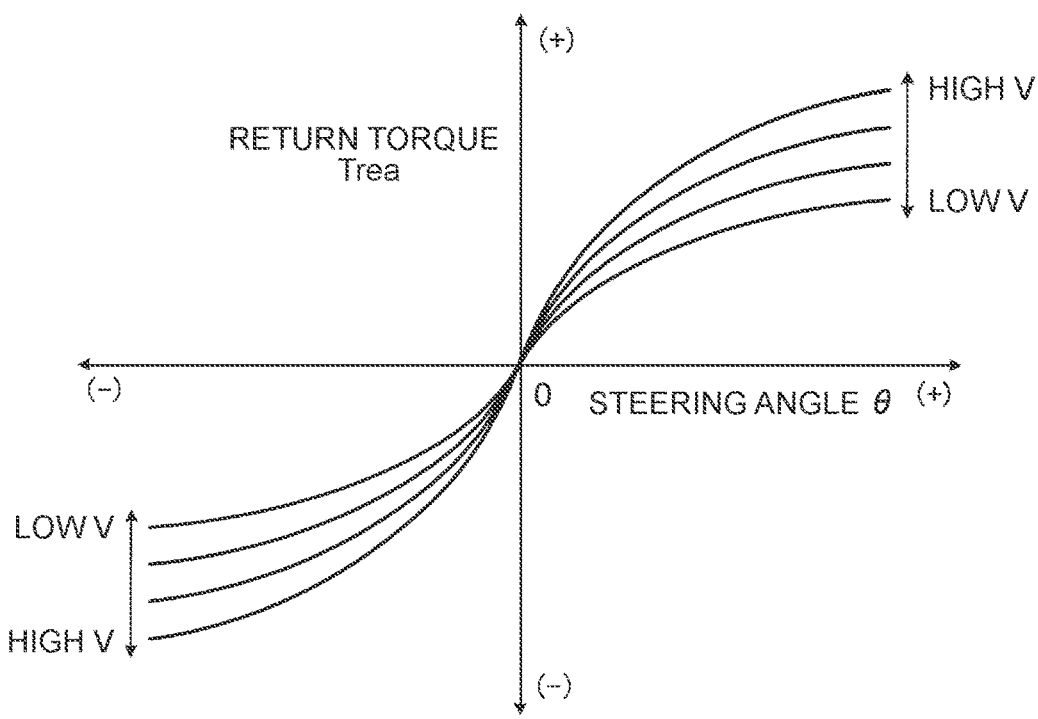
FIG. 5 is a map for calculating a return torque Trea based on a steering angle θ and a vehicle speed V.

In the illustrated embodiment, the EPS device 12 is a rack coaxial type electric power steering device, and includes an electric motor 28 and a ball screw type conversion mechanism 30 that converts a rotational torque of the electric motor 28 into a force in the reciprocating direction of the rack bar 18, for example. The EPS device 12 generates the steering assist torque Tsa by driving the rack bar 18 relative to a housing 32. Therefore, the magnitude of a return torque Trea when the steering assist torque Tsa is generated is smaller than the magnitude of the return torque Tre as shown in FIG. 5.

The EPS device 12 functions as a control torque generating device that generates a control torque Tc that modifies the return torque Trea. The magnitude of the control torque Tc is about one tenth of the magnitude of the return torque Trea. Further, when the driver steers, the EPS device 12 generates the steering assist torque Tsa based on a steering torque Ts and the vehicle speed V as necessary so as to reduce a steering burden on the driver. The EPS ECU 40 controls the steering assist torque Tsa and the control torque Tc by controlling the EPS device 12. A signal indicating the vehicle speed V detected by a vehicle speed sensor 41 is input to the EPS ECU 40.

The EPS device 12 may have any configuration known in the art as long as the EPS device 12 can generate the steering assist torque Tsa and the control torque Tc. For example, the EPS device 12 may be a rack-assisted type or column-assisted type electric power steering device that is not a rack coaxial type.

The steering shaft 22 is provided with a steering angle sensor 34 that detects the steering angle θ, that is, the rotation angle of the steering shaft 22, and a steering torque sensor 36 that detects the steering torque Ts. A signal indicating the steering angle θ detected by the steering angle sensor 34 and a signal indicating the steering torque Ts detected by the steering torque sensor 36 are also input to the EPS ECU 40. The steering angle sensor 34 and the steering torque sensor 36 detect the steering angle θ and the steering torque Ts, respectively, with the values detected when the vehicle 60 turns to the right being positive.

As shown in FIG. 1, a camera sensor 51, a radar sensor 52, a steering control switch 53, and an alarm device 54 are connected to the steering assist ECU 50. At least a part of the vehicle speed sensor 41, the camera sensor 51, and the like may be connected to the CAN 62 or another ECU.

The camera sensor 51 includes a camera unit that captures an image of scenery in front of the vehicle 60, and a recognition unit that analyzes image data obtained as the camera unit captures an image and recognizes a white line (lane boundary) and an obstacle on a road. The recognition unit of the camera sensor 51 repeatedly supplies information regarding the recognized white line and the obstacle to the steering assist ECU 50 every time a predetermined calculation cycle elapses.

The radar sensor 52 includes a radar transmission and reception unit and a signal processing unit (not shown), and the radar transmission and reception unit emits a radio wave in the millimeter wave band (hereinafter referred to as a "millimeter wave"), and receives a millimeter wave reflected by a three-dimensional object (for example, another vehicle, a bicycle, a guard rail, or a roadside structure) that is present within a radiation range (that is, a reflected wave). The signal processing unit acquires information (surrounding information) indicating a distance between the host vehicle and the three-dimensional object, a relative speed between the host vehicle and the three-dimensional object, a relative position (direction) of the three-dimensional object with respect to the host vehicle, and the like based on a phase difference between the transmitted millimeter wave and the received reflected wave, an attenuation level of the reflected wave, the time from the transmission of the millimeter wave to the reception of the reflected wave, and the like every time a predetermined time elapses, and supplies the information to the steering assist ECU 50.

The steering control switch 53 is operated by the driver and supplies a signal indicating whether the steering control switch 53 is on to the steering assist ECU 50. When the steering control switch 53 is on, it means that steering is guided as described later.

The alarm device 54 is activated when the steering assist ECU 50 determines that an obstacle is present in front of the vehicle 60 and it is required to perform avoidance steering so as not to collide with the obstacle, and issues an alarm. The alarm device 54 may be any of an alarm device that issues a visual alarm such as an alarm lamp, an alarm device that emits an auditory alarm such as an alarm buzzer, and an alarm device that issues a bodily alarm such as vibration of a seat, and may be any combination thereof.

Calculation of Target Control Torque Tct

In the first embodiment, the steering assist ECU 50 calculates the target control torque Tct as follows, and outputs a signal indicating the target control torque Tct to the EPS ECU 40. The EPS ECU 40 controls the EPS device 12 such that the control torque Tc becomes the target control torque Tct.

Note that, the control torque Tc acts in a direction of suppressing steering when the driver steers by additional turning such that the actual steering angle θ is separated from a target steering angle θt. Further, the control torque Tc acts to reduce easiness of steering to turn back when the driver steers to turn back such that the actual steering angle θ is separated from the target steering angle θt, as compared with the case where the control torque Tc does not act. Therefore, the control torque Tc acts as a steering guide torque that guides steering of the driver such that the actual steering angle θ becomes the target steering angle θt.

Figure 6:
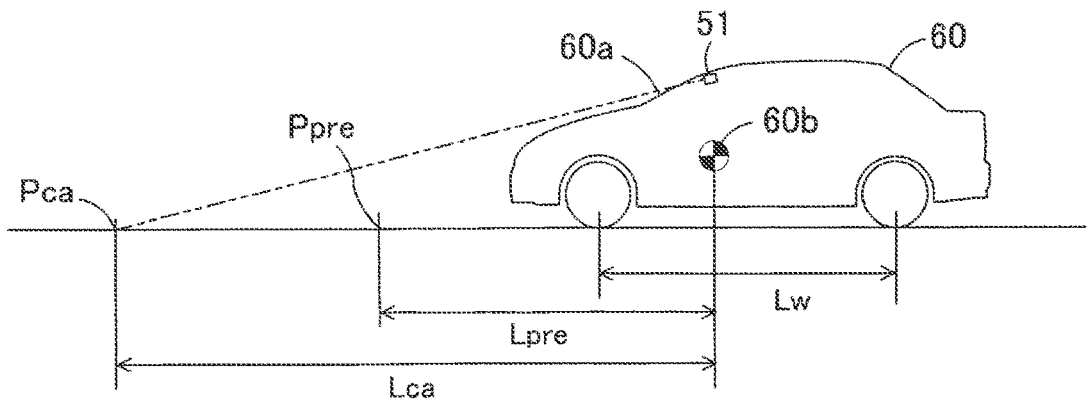

As shown in FIG. 6, the camera sensor 51 is fixed to an upper portion of an inner surface of a windshield 60*a* of the vehicle 60, and captures an image in front of the vehicle 60 centering on an imaging reference position Pca located in a distance Lca (positive constant) forward from a center of gravity 60*b* that is the reference position of the vehicle 60. The distance Lca is called an imaging reference distance Lca as necessary. The reference position of the vehicle 60 may be the positions of the front wheels 16FR, 16FL, the intermediate positions of the front and rear wheels, and the like.

The steering assist ECU 50 calculates a curve curvature ρca of a traveling path for the region centered on the imaging reference position Pca based on the white line information of the lane in front of the vehicle 60 acquired by the camera sensor 51, and stores the curve curvature in the RAM. Therefore, the camera sensor 51 and the steering assist ECU 50 function as a detection device that detects the curve curvature ρca of the traveling path for the region centered on the imaging reference position Pca.

Further, the steering assist ECU 50 reads the curve curvature ρca corresponding to a look-ahead time Δt from the RAM as a look-ahead curve curvature ρpre, and calculates the target steering angle θt based on the look-ahead curve curvature ρpre. The target steering angle θt is a target steering angle for making it easy for the actual steering angle to stay within a range suitable for causing the vehicle 60 to travel along the curve. In the first embodiment, the curvature in the direction in which the vehicle 60 turns to the right is positive.

The curve curvature ρca (1/m) is calculated in accordance with the following equation (1). In the following equation (1), V is the vehicle speed (m/s), and $\rho_0$ is the curve curvature (1/m) of the traveling path at the center of gravity 60*b* of the vehicle 60. Therefore, $\rho_0$ is the curve curvature ρca calculated before a time Lca/V required for the vehicle 60 to travel the imaging reference distance Lca shown in FIG. 6 and stored in the RAM. Δρ is a rate of change (1/m/m) of the curve curvature ρca calculated before the time Lca/V and stored in the RAM, that is, a change amount of the curve curvature per unit distance.

$$\rho ca = \rho_0 + V\Delta t \Delta \rho \tag{1}$$

As shown in FIG. 6, a distance (look-ahead distance) Lpre between the center of gravity 60*b* of the vehicle 60 and a look-ahead position Ppre is smaller than the imaging reference distance Lca. Note that, the look-ahead distance Lpre does not have to be constant. As can be understood from the above description, the curve curvature ρpre is the curve curvature at the look-ahead position Ppre, that is, the curve curvature at the position where the center of gravity 60*b* of the vehicle 60 reaches after the look-ahead time Δt.

The target steering angle θt (deg) is calculated in accordance with the following equation (2). In the following equation (2), Rst is a steering gear ratio of the steering device 10, A is the stability factor of the vehicle 60 (deg/(m²/s²)), and Lw is a wheelbase of the vehicle 60. The steering gear ratio Rst, the stability factor A, and the wheelbase Lw are known constant values determined by the specifications of the vehicle 60.

$$\theta t = Rst(1+AV^2)\rho pre Lw \tag{2}$$

Further, the steering assist ECU 50 calculates a target basic control torque Tctb based on a steering angle deviation Δθ that is a deviation θ−θt between the actual steering angle θ and the target steering angle θt. Further, the steering assist ECU 50 calculates the target control torque Tct as a product KvTctb of a vehicle speed coefficient Kv and the target basic control torque Tctb.

Figure 7:
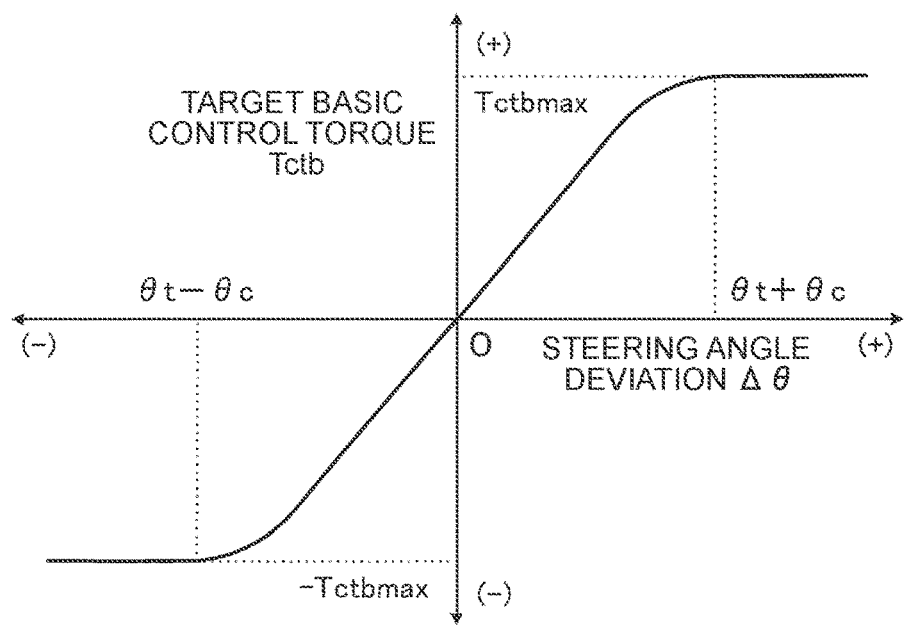
FIG. 7 is a map for calculating the target basic control torque Tctb based on the steering angle θ.
Figure 8:
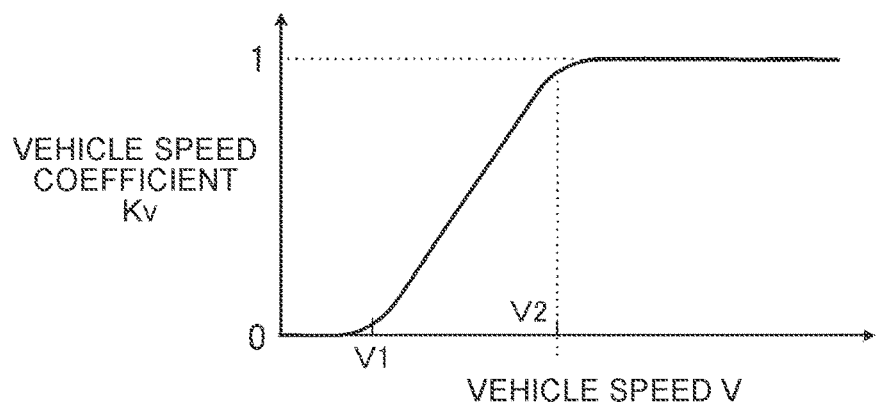
FIG. 8 is a map for calculating a conversion coefficient Kv based on the vehicle speed V.

As shown in FIG. 7, when the absolute value of the steering angle deviation Δθ is less than θt+θc, the target basic control torque Tctb increases as the absolute value of the steering angle deviation Δθ increases. When the absolute value of the steering angle deviation Δθ is equal to or larger than θt+θc, the absolute value is calculated to be a constant value of Tctbmax. Note that θc may be a positive constant. As shown in FIG. 8, the vehicle speed coefficient Kv is a value of 1 or less and 0 or more that becomes smaller as the vehicle speed V becomes lower.

Modification of Target Control Torque Tct Based on Necessity of Avoidance Steering In the first embodiment, when any obstacle is not present in front of the vehicle 60, the target control torque Tct is not modified to decrease. However, when an obstacle is present in front of the vehicle 60 and the avoidance steering is required so as not to collide with the obstacle, the target control torque Tct is reduced such that the avoidance steering can be easily performed. Therefore, the return torque Trea is modified by the reduced target control torque Tct.

Figure 2:
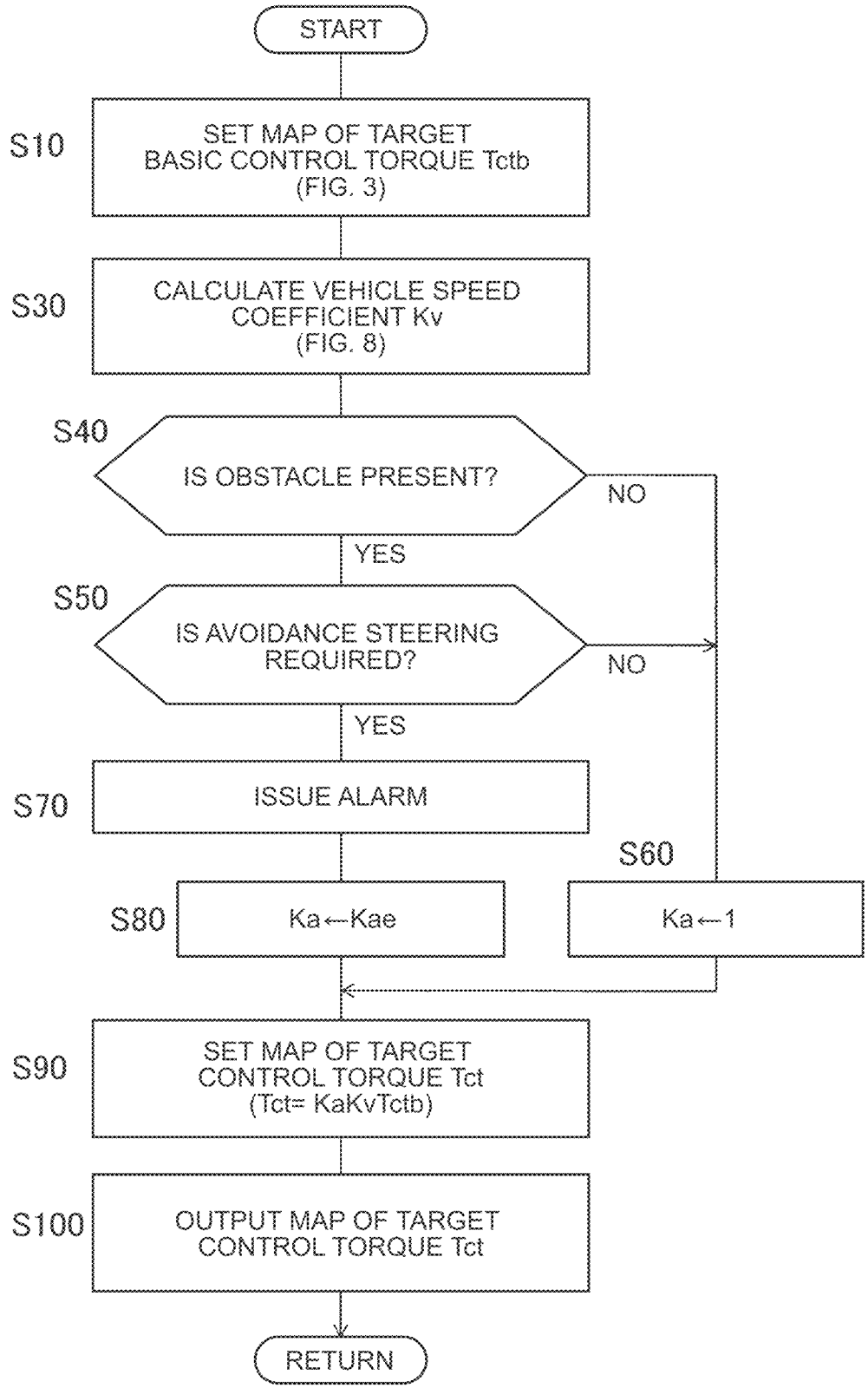
FIG. 2 is a flowchart showing a control routine of a target control torque Tct according to a first embodiment.
Figure 3:
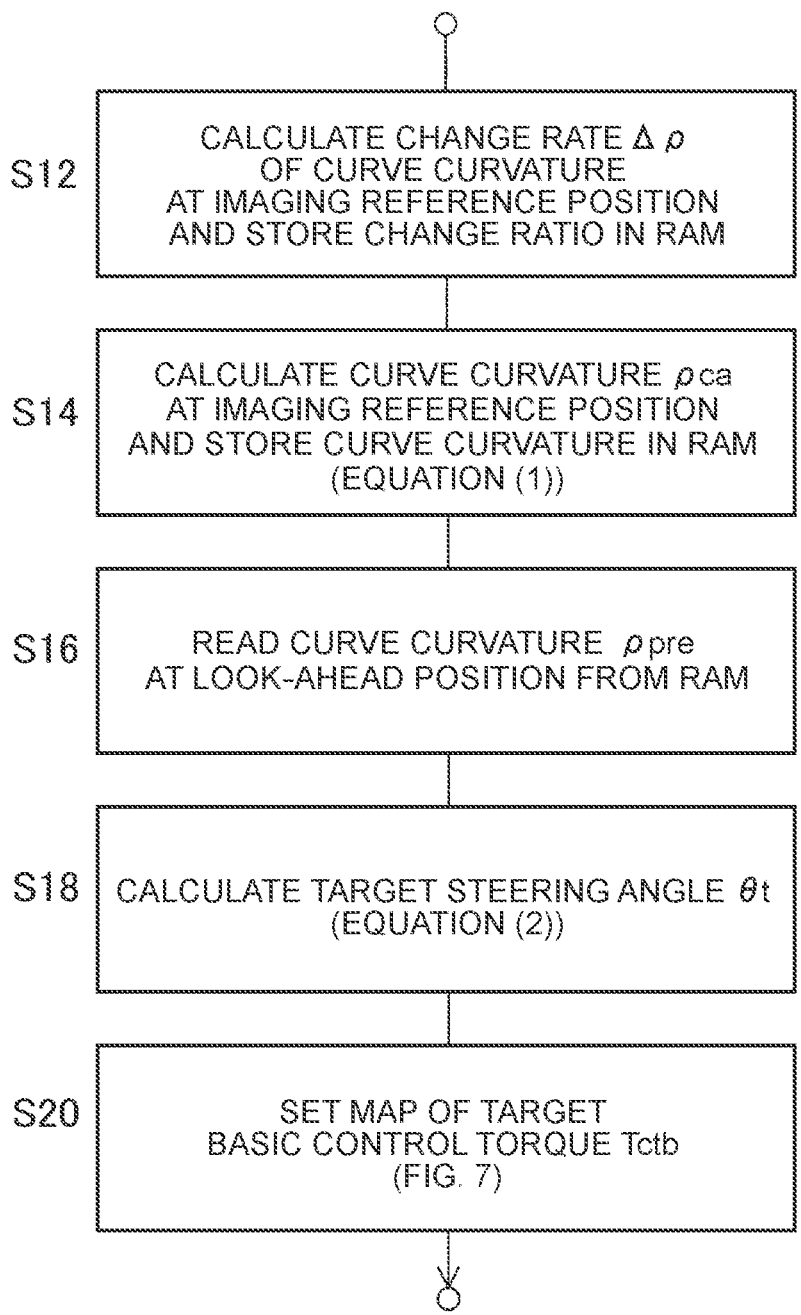
FIG. 3 is a flowchart showing a subroutine for determining a map of a target basic control torque Tctb executed in step S10 in FIG. 2.

The ROM of the steering assist ECU 50 stores a control program of the target control torque Tct corresponding to a flowchart shown in FIGS. 2 and 3. The CPU reads the control program from the ROM into the RAM, and executes control of the target control torque Tct in accordance with the flowchart shown in FIGS. 2 and 3 as described in detail later. The ROM also stores the maps shown in FIGS. 5 and 6.

Control Routine of Target Control Torque Tct

Next, a control routine of the target control torque Tct in the first embodiment will be described with reference to the flowchart shown in FIG. 2. Note that, the control of the target control torque Tct in accordance with the flowchart shown in FIG. 2 is repeatedly executed by the CPU of the steering assist ECU 50 at predetermined time intervals when an ignition switch (not shown in the drawing) and the steering control switch 53 are on. Further, in the following description, the control of the target control torque Tct in accordance with the flowchart shown in FIG. 2 is simply referred to as control.

First, in step S10, the CPU determines the map of the target basic control torque Tctb in accordance with the flowchart shown in FIG. 3.

In step S30, the CPU calculates the vehicle speed coefficient Kv by referring to the map shown in FIG. 8 based on the vehicle speed V. Note that, V1 and V2 shown in FIG. 8 may be, for example, 20 km/h and 60 km/h, respectively. Further, in FIG. 8, the vehicle speed coefficient Kv is 0 in the region where the vehicle speed V is low, but may be a positive value even in the region where the vehicle speed V is low.

In step S40, the CPU determines whether an obstacle such as a stopped vehicle is present in front of the vehicle 60 based on the information detected by the camera sensor 51 and the radar sensor 52. When the CPU makes a negative determination, the CPU advances the control to step S60, and when the CPU makes an affirmative determination, the CPU advances the control to step S50.

In step S50, the CPU determines whether the avoidance steering is required to be performed so as not to collide with the obstacle. When the CPU makes a negative determination, the CPU sets a correction coefficient Ka to 1 in step S60, and when the CPU makes an affirmative determination, the CPU advances the control to step S70.

In step S70, the CPU activates the alarm device 54 to issue an alarm that the avoidance steering is required to be performed so as not to collide with the obstacle.

In step S80, the CPU sets the correction coefficient Ka to Kae that is 0 or more and less than 1.

In step S90, the CPU sets a map of the target control torque Tct corresponding to the map of the target basic control torque Tctb shown in FIG. 7 by calculating the target control torque Tct in accordance with the following equation (3).

$$Tct = Ka Kv Tctb \quad (3)$$

Figure 11:
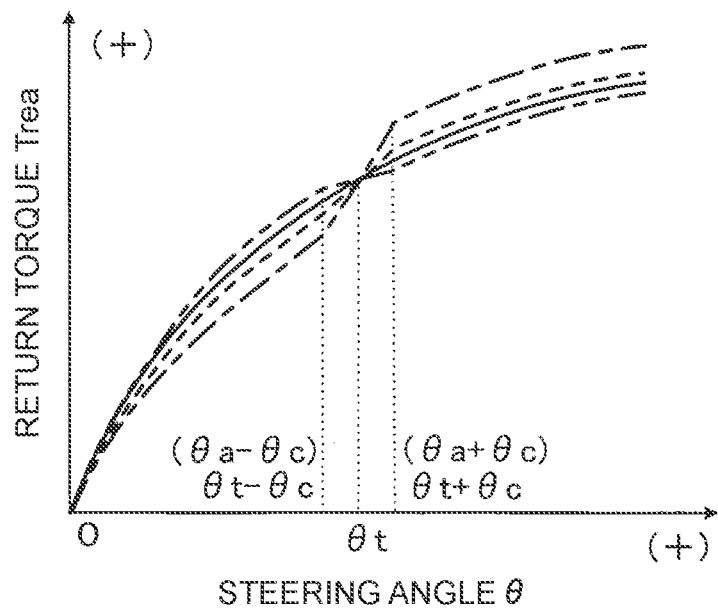
FIG. 11 is a map for calculating the return torque Tre based on the steering angle θ in a situation where the vehicle travels along a curve to the right.

In step S100, the CPU outputs a signal indicating the map of the target control torque Tct to the EPS ECU 40. The EPS ECU 40 modifies the map of the return torque Trea (FIG. 5) by the map of the target control torque Tct, calculates a target return torque Tret based on the modified map of the return torque Trea, and controls the EPS device 12 such that the return torque becomes the target return torque Tret. The alternate long and short dash line in FIG. 11 shows an example of the modified map of the return torque Trea.

In step S12 of the flowchart shown in FIG. 3, the CPU calculates a change rate Δρ of the curve curvature with respect to the region centered on the imaging reference position Pca based on the white line information of the lane in front of the vehicle 60 acquired by the camera sensor 51, and stores the change rate Δρ in the RAM.

In step S14, the curve curvature ρca of the traveling path is calculated for the region centered on the imaging reference position Pca in accordance with the above equation (1) and stored in the RAM. The curve curvature ρca may be set to 0 from the start of control until the time Lca/V elapses.

In step S16, the CPU reads the curve curvature ρca calculated before the look-ahead time Δt and stored in the RAM as the curve curvature ρpre at the look-ahead position Ppre from the RAM.

In step S18, the CPU sets the target steering angle θt as a target steering operation amount for causing the vehicle 60 to travel along the curve of the traveling path in accordance with the above equation (2) based on the vehicle speed V and the curve curvature ρpre at the look-ahead position Ppre.

In step S20, as shown in FIG. 7, the CPU determines the map of the target basic control torque Tctb such that the target basic control torque Tctb becomes 0 when the steering angle θ is the target steering angle θt. As described above, the magnitude of the target basic control torque Tctb becomes larger as the absolute value of the steering angle deviation Δθ is larger when the absolute value of the deviation Δθ (=θ−θt) between the steering angle θ and the target steering angle θt is less than θt+θc. Further, the magnitude of the target basic control torque Tctb becomes a constant value of Tctbmax when the absolute value of the steering angle deviation Δθ is θt+θc or more.

Operations in First Embodiment

Next, operations according to the first embodiment in a case where the target steering angle θt is 0 (C1), a case where the target steering angle θt is a positive value (C2), and a case where the target steering angle θt is a negative value (C3) will be described.

C1. Case Where Target Steering Angle θt is 0

Figure 9:
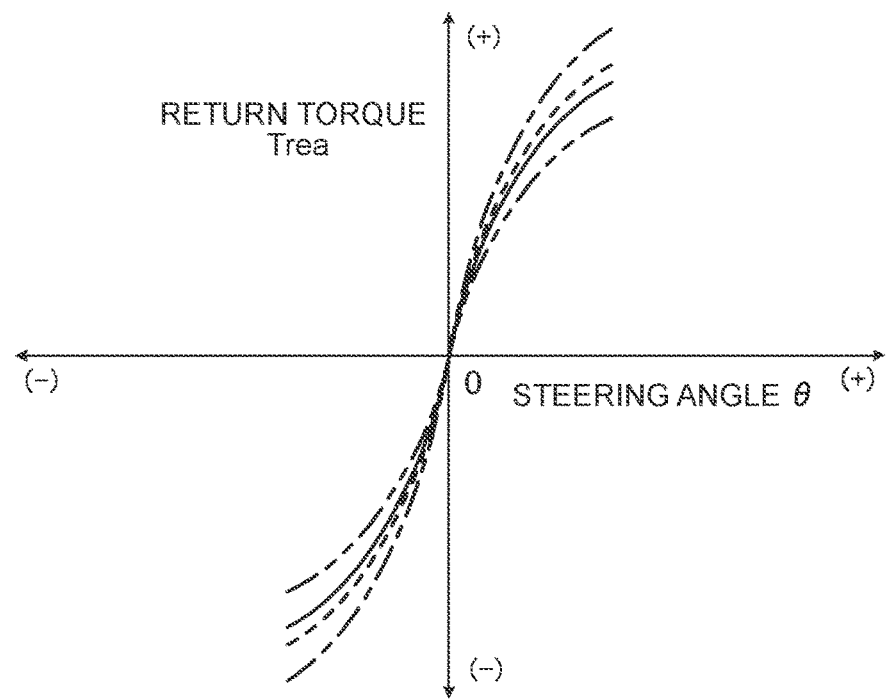
FIG. 9 is a map for calculating the return torque Tre based on the steering angle θ in a situation where a vehicle travels straight.

The case where the target steering angle θt is 0 is the case where the vehicle 60 travels along a straight lane. The avoidance steering for suppressing collision with the obstacle is not required, and when the correction coefficient Ka is 1, the magnitude of the target control torque Tct is not reduced. Therefore, the modified map of the return torque Trea by the target control torque Tct becomes the map shown by the alternate long and short dash line in FIG. 9, for example. That is, a ratio of the change amount of the return torque Trea after the modification to the change amount of the steering angle θ from 0 becomes larger than the ratio of the change amount of the return torque Trea before the modification (solid line in FIG. 9) to the change amount of the steering angle θ.

Therefore, the reaction force torque when the steering angle θ changes to a value other than 0 becomes larger when the return torque Trea is modified by the target control torque Tct, whereby the steering angle θ tends to remain at the target steering angle θt, that is, 0. Therefore, the steering is guided such that the steering angle θ becomes the target steering angle θt (=θ).

Figure 10:
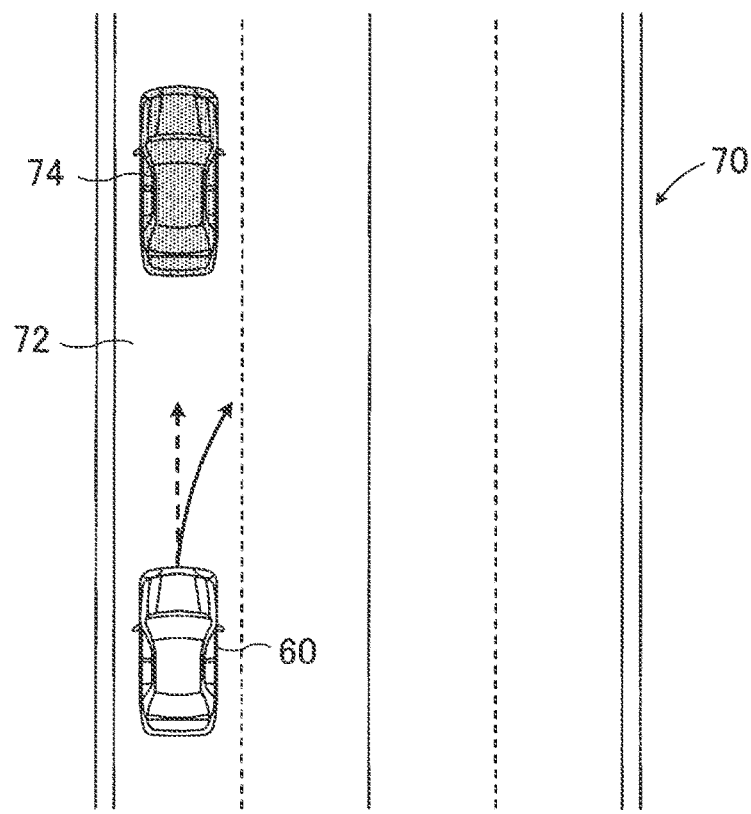
FIG. 10 is a diagram showing a situation in which an obstacle is present in front of the vehicle traveling straight ahead and avoidance steering is required.

FIG. 10 shows a situation in which a road 70 is a straight line, the vehicle 60 travels straight in a lane 72, and an obstacle such as a stopped vehicle 74 is present in front of the vehicle 60. In this situation, since the avoidance steering is required to suppress the vehicle 60 from colliding with the obstacle, the correction coefficient Ka becomes Kae that is smaller than 1, and the magnitude of the target control torque Tct is reduced. Therefore, the modified map of the return torque Trea is, for example, the map shown by the broken line in FIG. 9. That is, the ratio of the change amount of the modified return torque Trea to the change amount of the steering angle θ from 0 is smaller than that in the case shown by the alternate long and short dash line.

Therefore, the reaction force torque when the steering angle θ changes to a value other than 0 is smaller than that in the case shown by the alternate long and short dash line. Accordingly, in any of the cases where the change in the steering angle θ due to the avoidance steering is a change from 0 to a positive value (steering in the clockwise direction) and a change from 0 to a negative value (steering in the counterclockwise direction), the steering angle θ tends to be the steering angle required for the avoidance steering. In other words, the reaction force torque at the start of the avoidance steering becomes small, whereby the avoidance steering by the driver becomes easy.

C2. Case Where Target Steering Angle θt is Positive Value

The case where the target steering angle θt is a positive value is the case where the vehicle 60 travels along a lane that curves to the right. When the avoidance steering for suppressing collision with the obstacle is not required, and the correction coefficient Ka is 1, the magnitude of the target control torque Tct is not reduced. Therefore, the modified map of the return torque Trea becomes the map shown by the alternate long and short dash line in FIG. 11, for example. That is, in the range of the steering angle θ from θt−θc to θt+θc, the ratio of the change amount of the return torque Trea after the modification to the change amount of the steering angle θ from the target steering angle θt is larger than the ratio of the change amount of the return torque Trea before the modification (the solid line in FIG. 11) to the change amount of the steering angle θ.

Therefore, the reaction force torque when the steering angle θ increases from the target steering angle θt, the magnitude of the return torque Trea is modified by the target control torque Tct, whereby the steering angle θ tends to remain at the target steering angle θt. On the contrary, the reaction force torque when the steering angle θ decreases from the target steering angle θt becomes smaller when the magnitude of the return torque Trea is modified by the target control torque Tct. Therefore, the steering angle θ does not easily decrease as compared with the case where the return torque Trea is not modified (the solid line in FIG. 11). Therefore, the steering is guided such that the steering angle θ easily becomes the target steering angle θt.

Figure 12:
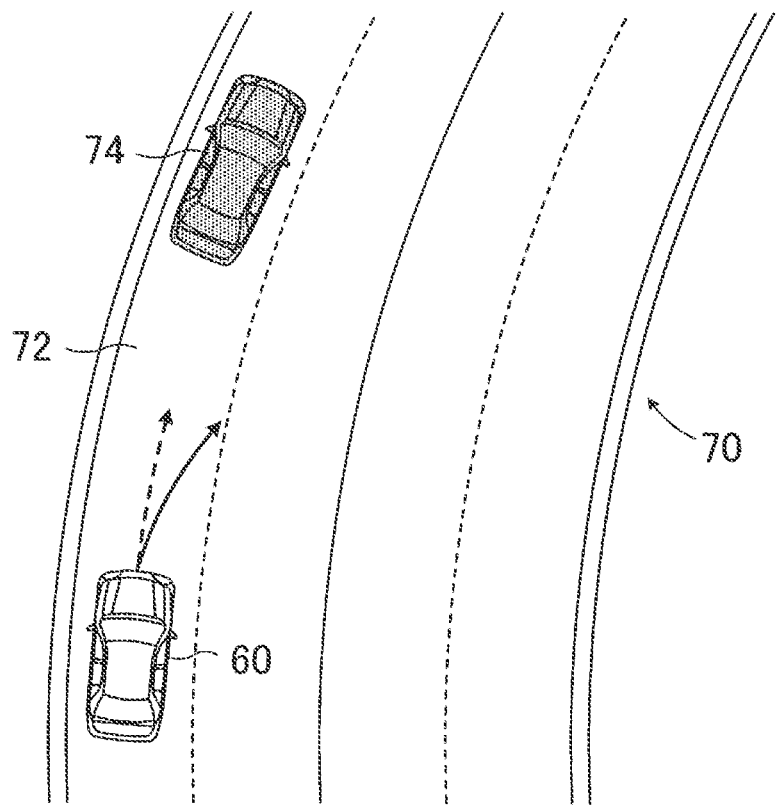
FIG. 12 is a diagram showing a situation in which an obstacle is present in front of the vehicle traveling along a curve to the right and the avoidance steering is required.

FIG. 12 shows a situation in which the road 70 is curved to the right, the vehicle 60 travels along a curve to the right in the lane 72, and an obstacle such as the stopped vehicle 74 is present in front of the vehicle 60. In this situation, since the avoidance steering for suppressing collision with the obstacle is required, the correction coefficient Ka becomes Kae that is smaller than 1, and the magnitude of the target control torque Tct is reduced. Therefore, the modified map of the return torque Trea is, for example, the map shown by the broken line in FIG. 11. That is, the ratio of the change amount of the return torque Trea after the modification to the change amount of the steering angle θ from the target steering angle θt is smaller than that in the case shown by the alternate long and short dash line.

Therefore, the reaction force torque when the steering angle θ increases from the target steering angle θt due to the additional turning is smaller than that in the case shown by the alternate long and short dash line. Therefore, even when the change in the steering angle θ due to the avoidance steering is an increasing change, that is, even when the avoidance steering is steering by additional turning, the steering angle θ tends to be the steering angle required for the avoidance steering. In other words, the reaction force torque in the additional turning direction at the start of the avoidance steering becomes small, whereby the avoidance steering by the driver becomes easy.

On the contrary, the return torque when the steering angle θ decreases from the target steering angle θt by turning back is larger than that in the case shown by the alternate long and short dash line, whereby the steering angle θ tends to decrease. Therefore, even when the change in the steering angle θ due to the avoidance steering is a decreasing change, that is, even when the avoidance steering is steering by turning back, the steering angle θ tends to be the steering angle required for the avoidance steering. In other words, the return torque in the direction of turning back at the start of the avoidance steering becomes small, whereby the avoidance steering by the driver becomes easy.

C3. Case Where Target Steering Angle θt is Negative Value

The case where the target steering angle θt is a negative value is the case where the vehicle 60 travels along a lane that curves to the left. In this case, the return torque Trea is controlled in the same manner as in the case of C2, except that the steering angle θ, the return torque Trea, and the like are negative values.

Therefore, when the avoidance steering is not required, the steering is guided such that the steering angle θ easily becomes the target steering angle θt. Further, when the avoidance steering is required, the magnitude of the return torque Trea is modified by the target control torque Tct, whereby that the steering angle θ tends to become the steering angle required for the avoidance steering. Therefore, the avoidance steering by the driver becomes easy regardless of whether the avoidance steering is steering by additional turning or steering by turning back.

Second Embodiment

Figure 13:
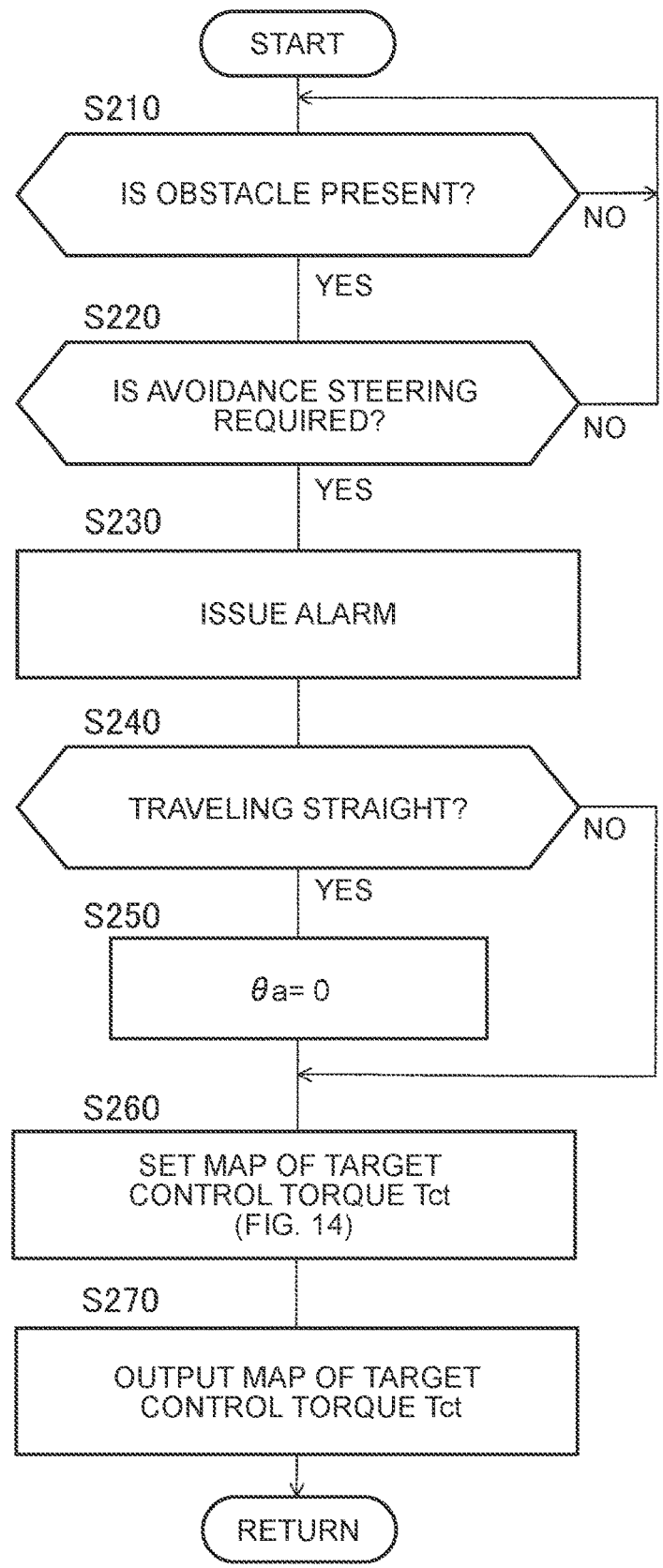
FIG. 13 is a flowchart showing a control routine of the target control torque Tct according to a second embodiment.

FIG. 13 is a flowchart showing a control routine of the target control torque Tct according to a second embodiment. Note that, the control of the target control torque Tct in accordance with the flowchart shown in FIG. 13 is repeatedly executed by the CPU of the steering assist ECU 50 at predetermined time intervals when an ignition switch (not shown in the drawing) is on and the steering control switch 53 is off. Further, in the following description, the control of the target control torque Tct in accordance with the flowchart shown in FIG. 13 is simply referred to as control.

The CPU executes steps S210 to S230 in the same manner as in steps S40, S50, and S70 of the first embodiment, respectively. However, when the CPU makes a negative determination in steps S210 and S220, the CPU temporarily terminates the control.

In step S240, the CPU determines whether the vehicle 60 is traveling straight, for example, by determining whether the absolute value of the steering angle θ is equal to or less than the reference value. When the CPU makes a negative determination, the CPU advances the control to step S260, and when the CPU makes an affirmative determination, the CPU advances the control to step S250.

In step S250, the CPU sets a current steering angle θa that is used for setting the map of the target control torque Tct in step S260 (to be described later) to 0.

Figure 14:
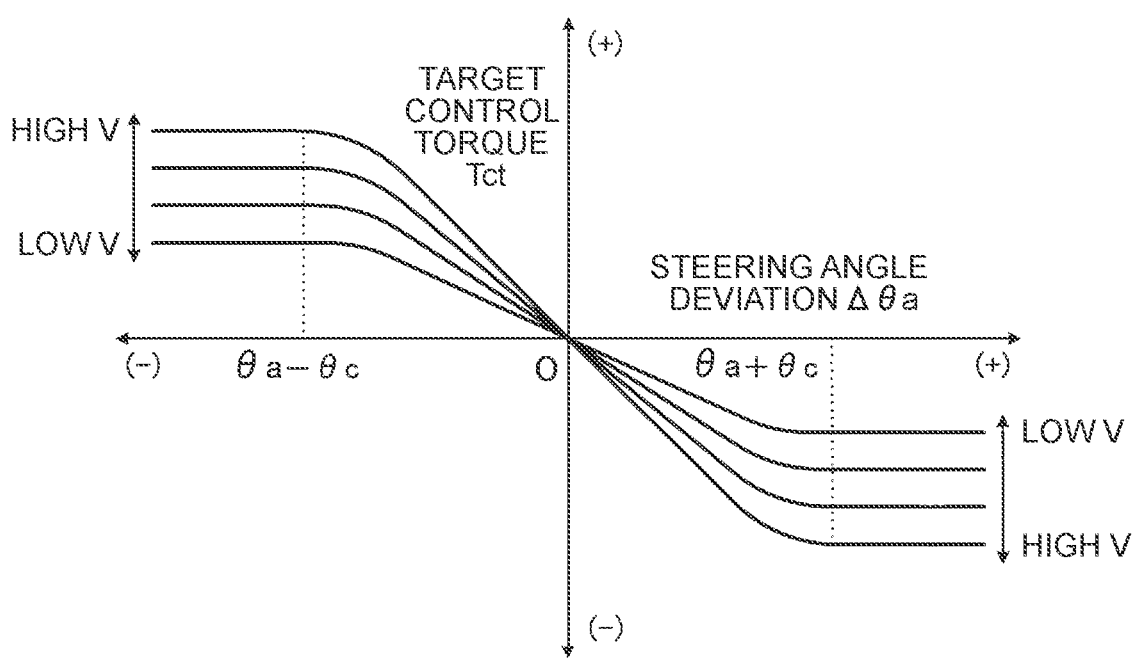
FIG. 14 is a map for calculating the target control torque Tct based on the steering angle θ and the vehicle speed V in the first embodiment.

In step S260, the CPU sets a map of the target control torque Tct shown in FIG. 14. As shown in FIG. 14, the target control torque Tct is a negative value in a region where the steering angle θ is larger than the current steering angle θa, and is a positive value in a region where the steering angle θ is smaller than the current steering angle θa. The magnitude of the target control torque Tct becomes larger as the absolute value of a steering angle deviation Ma is larger when the absolute value of a deviation Ma (=θ−θa) between the steering angle θ and the current steering angle θa is less than θ+θc. Further, the magnitude of the target control torque Tct becomes a constant value when the absolute value of the steering angle deviation Δθa is θ+θc or more. Further, the magnitude of the target control torque Tct increases as the vehicle speed V increases. Note that θc may be a value different from θc in the first embodiment.

In step S270, the CPU outputs a signal indicating a map of the target control torque Tct to the EPS ECU 40 as in step S100 above. The EPS ECU 40 modifies the map of the return torque Trea (FIG. 5) by the map of the target control torque Tct, calculates a target return torque Tret based on the modified map of the return torque Trea, and controls the EPS device 12 such that the return torque becomes the target return torque Tret. The alternate long and two short dash line in FIG. 11 shows an example of the modified map of the return torque Trea.

Operations in Second Embodiment

Next, operations according to the second embodiment in a case where the current steering angle θa is 0 (C4), a case where the current steering angle θa is a positive value (C5), and a case where the current steering angle θa is a negative value (C6) will be described.

C4. Case Where Current Steering Angle θa is 0

The case where the current steering angle θa is 0 is the case where the vehicle 60 travels along a straight lane. When the avoidance steering for suppressing collision with an obstacle is not required, the map of the return torque Trea is not modified by the target control torque Tct. Therefore, the map of the return torque Trea is, for example, the map shown by the solid line in FIG. 9.

On the other hand, when the avoidance steering for suppressing the vehicle 60 from colliding with an obstacle is required, for example, as in the situation shown in FIG. 10, the map of the return torque Trea is modified by the target control torque Tct. Therefore, the modified map of the return torque Trea is, for example, the map shown by the alternate long and two short dash line in FIG. 9. That is, a ratio of the change amount of the return torque Trea after the modification to the change amount of the steering angle θ from 0 becomes smaller than the ratio of the change amount of the return torque Trea before the modification (solid line in FIG. 9) to the change amount of the steering angle θ.

Therefore, the reaction force torque when the steering angle θ changes to a value other than 0 becomes smaller when the return torque Trea is modified by the target control torque Tct. Accordingly, in any of the cases where the change in the steering angle θ due to the avoidance steering is a change to a positive value (steering in the clockwise direction) and a change to a negative value (steering in the counterclockwise direction), the steering angle θ tends to be the steering angle required for the avoidance steering. In other words, the reaction force torque at the start of the avoidance steering becomes small, whereby the avoidance steering by the driver becomes easy.

C5. Case Where Current Steering Angle θa is Positive Value

The case where the current steering angle θa is a positive value is the case where the vehicle 60 travels along a lane that curves to the right. When the avoidance steering for suppressing collision with an obstacle is not required, the map of the target control torque Tct is not modified by the target control torque Tct. Therefore, the map of the return torque Trea is, for example, the map shown by the solid line in FIG. 11.

On the other hand, when the avoidance steering for suppressing the vehicle 60 from colliding with an obstacle is required, for example, as in the situation shown in FIG. 12, the map of the return torque Trea is modified by the target control torque Tct. Therefore, the map of the return torque Trea is, for example, the map shown by the alternate long and two short dash line in FIG. 11. That is, in the range of the steering angle θ from θa−θc to θa+θc, the ratio of the change amount of the return torque Trea after the modification to the change amount of the steering angle θ from the steering angle θa is smaller than the ratio of the change amount of the return torque Trea before the modification (the solid line in FIG. 11) to the change amount of the steering angle θ.

Therefore, the reaction force torque when the steering angle θ increases from the steering angle θa becomes smaller as the magnitude of the return torque Trea is modified by the target control torque Tct. That is, the reaction force torque when the steering angle θ increases from the target steering angle θa due to the additional turning is smaller than that in the case shown by the solid line. Therefore, even when the change of the steering angle θ due to the avoidance steering is an increasing change, that is, even when the avoidance steering is steering by additional turning, the steering angle θ tends to be the steering angle required for the avoidance steering. In other words, the reaction force torque in the additional turning direction at the start of the avoidance steering becomes small, whereby the avoidance steering by the driver becomes easy.

On the contrary, the return torque when the steering angle θ decreases from the steering angle θa by turning back is larger than that in the case shown by the solid line, whereby the steering angle θ tends to decrease. Therefore, even when the change of the steering angle θ due to the avoidance steering is a decreasing change, that is, even when the avoidance steering is steering by turning back, the steering angle θ tends to be the steering angle required for the avoidance steering. In other words, the return torque in the direction of turning back at the start of the avoidance steering becomes large, whereby the avoidance steering by the driver becomes easy.

C6. Case Where Current Steering Angle θa is Negative Value

The case where the current steering angle θa is a negative value is the case where the vehicle 60 travels along a lane that curves to the left. In this case, the return torque Trea is controlled in the same manner as in the case of C5, except that the steering angle θ, the return torque Trea, and the like are negative values.

Therefore, when the avoidance steering is not required, the map of the target control torque Tct is not modified by the target control torque Tct. Further, when the avoidance steering is required, the magnitude of the return torque Trea is modified by the target control torque Tct, whereby that the steering angle θ tends to become the steering angle required for the avoidance steering. Therefore, the avoidance steering by the driver becomes easy regardless of whether the avoidance steering is steering by additional turning or steering by turning back.

The present disclosure has been described in detail above with respect to specific embodiments. However, it is obvious to those skilled in the art that the present disclosure is not limited to the above-described embodiments, and various other embodiments are possible within the scope of the present disclosure.

For example, in the first and second embodiments described above, the steering device 10 is a steering device in which the steering wheel 14 and the right and left front wheels 16FR, 16FL are mechanically connected and that includes the electric power steering device 12. However, the vehicle steering assist device according to the present disclosure may be applied to a vehicle in which the steering device is a steer-by-wire type steering device. When the steering device is a steer-by-wire type steering device, the return torque Trea after the modification may be generated by an actuator that applies a steering reaction force to the steering wheel.

Further, in the second embodiment described above, the control of the target control torque Tct in accordance with the flowchart shown in FIG. 13 is executed when the ignition switch is on and the steering control switch 53 is off. However, the second embodiment may be applied to a vehicle in which the steering control switch 53 is not provided and the steering guidance is not provided.

Further, in the first and second embodiments described above, the steering input member is the steering wheel 14 that is rotationally operated. However, the steering input member may be, for example, a joystick type steering input member that is pivotally operated.

What is claimed is:

1. A vehicle steering assist device comprising:
   a steering wheel operated by a driver, an operated amount of the steering wheel being a steering angle;
   a steering device configured to turn a turning wheel in accordance with the steering angle and apply a return torque to urge the steering wheel to a neutral position, wherein the return torque is increased as the steering angle increases;
   a control torque generating device that applies a control torque to the steering wheel to modify the return torque in order to assist a steering operation of the driver;
   a surrounding information detecting device including a radar sensor and a camera sensor configured to detect an obstacle and a lane; and
   a processor configured to
      calculate a target steering angle for causing the vehicle to travel along the lane detected by the surrounding information detecting device,
      set a map that defines the control torque in relation to a deviation between the steering angle and the target steering angle, for a range where the deviation is positive and a range where the deviation is negative, such that
         i) a ratio of an increase amount of the modified return torque to an increase amount of the steering angle is higher compared with when the control torque is not applied, in the range where the deviation is positive, and
         ii) a ratio of a decrease amount of the modified return torque to a decrease amount of the steering angle is higher compared with when the control torque is not applied, in the range where the deviation is negative, and
      instruct the control torque generating device to apply the control torque defined by the map,
      determine whether avoidance steering is required for the vehicle to avoid collision colliding with the obstacle when the surrounding information detecting device detects the obstacle in front of the vehicle, and
      reset the map in response to a determination that the avoidance steering is required such that a ratio of a change amount of the modified return torque to a change amount of the steering angle from the target steering angle is smaller compared with when the processor determines that the avoidance steering is not required.

2. The vehicle steering assist device according to claim 1, wherein
   in response to the determination that the avoidance steering is required, the processor is configured to reset the map such that a ratio of a change amount of the modified return torque to a change amount of the steering angle from a current steering angle is smaller compared with when the processor determines that the avoidance steering is not required.

3. The vehicle steering assist device according to claim 1, wherein
   when the processer determines that the avoidance steering is required and the steering angle exceeds the target steering angle, the processor is configured to set the modified return torque lower than when the processor determines the avoidance steering is not required, and
   when the processer determines that the avoidance steering is required and the steering angle becomes smaller than the target steering angle, the processor is configured to set the modified return torque higher than when the processor determines the avoidance steering is not required.

* * * * *